United States Patent [19]

Debruyne et al.

[11] Patent Number: 5,687,071
[45] Date of Patent: Nov. 11, 1997

[54] VOLTAGE LOWERING DEVICE AND ASYNCHRONOUS TRACTION SYSTEM SUPPLIED FROM A SINGLE-PHASE MAINS SUPPLY INCORPORATING A DEVICE OF THIS KIND

[75] Inventors: Marc Debruyne, Bartres; Rong Fan Liu, Pau, both of France

[73] Assignee: Gec Alsthom Transport SA, Paris, France

[21] Appl. No.: 682,087

[22] Filed: Jul. 17, 1996

[30] Foreign Application Priority Data

Jul. 18, 1995 [FR] France .................. 95 08669

[51] Int. Cl.[6] .......................................... H02M 7/217
[52] U.S. Cl. ................................ 363/127; 363/68
[58] Field of Search ........................ 363/126, 127, 363/129, 68; 323/282

[56] References Cited

U.S. PATENT DOCUMENTS

| 4,030,018 | 6/1977 | Tsuboi ......................... 363/68 |
| 4,323,962 | 4/1982 | Steigerwald ................... 363/127 |
| 5,027,264 | 6/1991 | DeDoncker et al. . | |

OTHER PUBLICATIONS

Hirofumi Matsuo et al, "An Improved 210KVA Auxiliary Power Supply System of the Electric Railway Rolling Stock by Using a New Two Phase Buck-Boost Type DC-DC Converter", *Proceedings of the Annual Power Electronics Specialists Conference*, Taiwan, Jun. 20-24, 1994, vol. 1, 20 Jun. 1994, pp. 709-713.

Kheraluwala, M.H., "Performance Characterization of a High-Power Dual Active Bridge DC-to-DC Converter", *IEEE Transactions on Industry Applications*, vol. 28, No. 6, 1 Nov. 1992, pp. 1294-1301.

*Primary Examiner*—Peter S. Wong
*Assistant Examiner*—Rajnikant B. Patel
*Attorney, Agent, or Firm*—Sughrue,Mion,Zinn,Macpeak & Seas, PLLC

[57] ABSTRACT

A voltage lowering device includes at least one pair of forced commutation single-phase rectifiers connected to secondary windings of a main traction transformer. The power drawn from a direct current mains power supply passes through the main traction transformer and is recovered at a secondary winding by means of a forced commutation single-phase rectifier operating as a voltage increasing controlled rectifier. The other forced commutation single-phase rectifiers operate as synchronous voltage inverters. An asynchronous traction system supplied by a single-phase mains power supply includes a voltage lowering device as previously described.

9 Claims, 3 Drawing Sheets

VOLTAGE LOWERING DEVICE AND ASYNCHRONOUS TRACTION SYSTEM SUPPLIED FROM A SINGLE-PHASE MAINS SUPPLY INCORPORATING A DEVICE OF THIS KIND

BACKGROUND OF THE INVENTION

1. Field of the Invention

The present invention concerns asynchronous traction systems supplied from a single-phase main supply and in particular a voltage lowering device and an asynchronous traction system supplied from a single-phase main supply incorporating a device of this kind.

2. Description of the Prior Art

Prior art asynchronous traction systems supplied by a single-phase main supply essentially employ voltage inverters driving the traction motors and forced commutation single-phase rectifiers providing an intermediate direct current voltage supply to the inverters.

These prior art traction systems enable standardization of the arms of the inverters and the arms of the rectifiers that are rated only to withstand the intermediate direct current voltage.

In some applications the traction systems must operate from a variety of alternating current and direct current main power supplies, for example a direct current supply at 3 000 V.

In these applications the inverters and the rectifiers cannot be connected directly to the direct current high voltage. A prior art solution to this problem entails reconfiguring the arms of the rectifiers to obtain a series-parallel chopper in order to obtain from the 3 000 V supply the same direct current intermediate voltage fed to the traction inverters from a single-phase supply.

One way to implement this solution is to use electromechanical switch means and smoothing inductors.

It is sometimes possible to replace these inductors by the secondary windings of the single-phase traction transformer.

A drawback of these prior art solutions is the need for a plurality of intermediate voltages.

These intermediate voltages are not all referred to the same potential.

For example, one of the intermediate voltages is connected directly to the positive terminal of the supply voltage. A direct consequence of this is that all of the equipment on the downstream side of that intermediate voltage must be designed to withstand a voltage of 3 000 V referred to ground (the IEC standard specifies 9 500 V (rms) at 50 Hz).

This insulation constraint leads to overrating of the insulators and the routing distances and to increasing the thermal resistance of the semiconductor cooling systems.

Accordingly one object of the invention is a voltage lowering device used in an asynchronous traction system supplied from a single-phase main power supply that does not have the drawbacks mentioned above.

SUMMARY OF THE INVENTION

The basic idea of the voltage lowering device of the invention is to use only one intermediate direct current voltage.

The value of the intermediate direct current voltage is approximately half the input voltage.

The intermediate direct current voltage is isolated galvanically or otherwise from the main power supply.

In accordance with the invention the voltage lowering device includes at least one pair of forced commutation single-phase rectifiers connected to secondary windings of a main traction transformer, the power drawn from a direct current main power supply passing through said main traction transformer and being recovered at a secondary winding by means of a forced commutation single-phase rectifier operating as a voltage increasing controlled rectifier, the other forced commutation single-phase rectifiers operating as synchronous voltage inverters, the primary winding of said main transformer being open circuit.

A first preferred embodiment of the voltage lowering device has at least one of the following features:

a first and a second forced commutation single-phase rectifier respectively supply first and second secondary windings of a main traction transformer, said first and second single-phase rectifiers operating as synchronous voltage inverters and respectively supplying said first and second secondary windings of said main traction transformer, and a third forced commutation single-phase rectifier operates as a voltage increasing controlled rectifier and is supplied by said third secondary winding of said main traction transformer, said first, second and third secondary windings of the main transaction transformer have the same number of turns.

In a second preferred embodiment of the voltage lowering device said first and secondary forced commutation single-phase rectifiers of each of said pairs are connected in series, each of said pairs being supplied by an input voltage, said first single-phase rectifiers operating as synchronous voltage inverters and supplying said first secondary winding of the associated main traction transformer and said second forced commutation single-phase rectifiers operating as voltage increasing controlled rectifiers supplied by said second secondary winding of the associated main traction transformer.

In either of the preferred embodiments the voltage lowering device has at least one of the following features:

said first and second secondary windings of said main traction transformer are supplied by a squarewave alternating current voltage at a frequency such that the magnetic circuit of the main traction transformer is not saturated, said single-phase rectifiers operate as voltage increasing controlled rectifiers and regulate their output direct current voltage to a value slightly greater than half the value of the input voltage.

Finally, in another aspect the invention consists in an asynchronous traction system supplied by a single-phase main power supply including a voltage lowering device as previously described.

One advantage of the voltage lowering device of the invention is that series-parallel choppers are no longer used.

Other objects, features and advantages of the invention will emerge from a reading of the description of the preferred embodiment of the voltage lowering device given with reference to the accompanying drawings.

3

Figure 2:
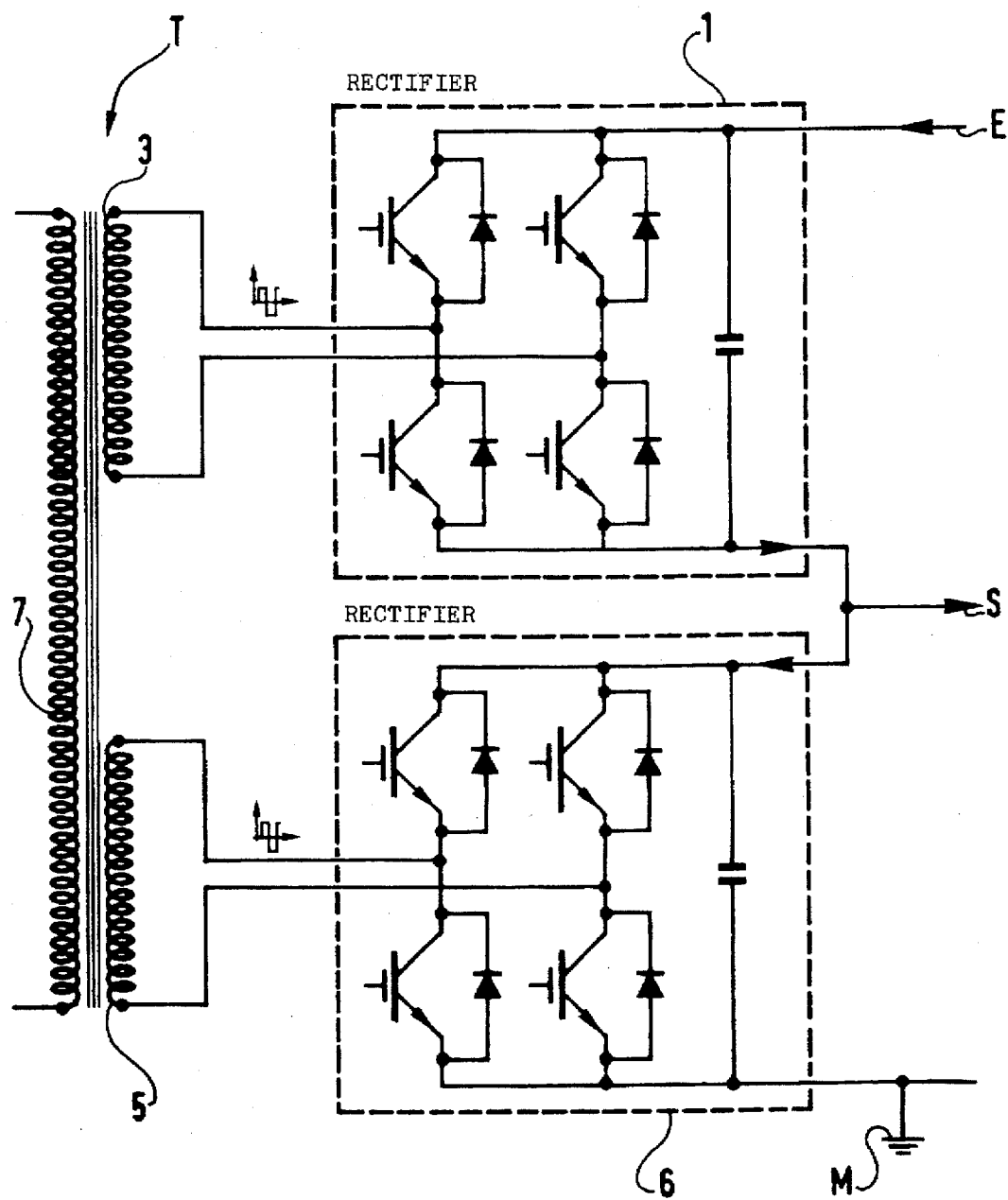
FIG. 2 shows a block schematic of a preferred embodiment of the voltage lowering device of the invention that does not use galvanic isolation.
Figure 3:
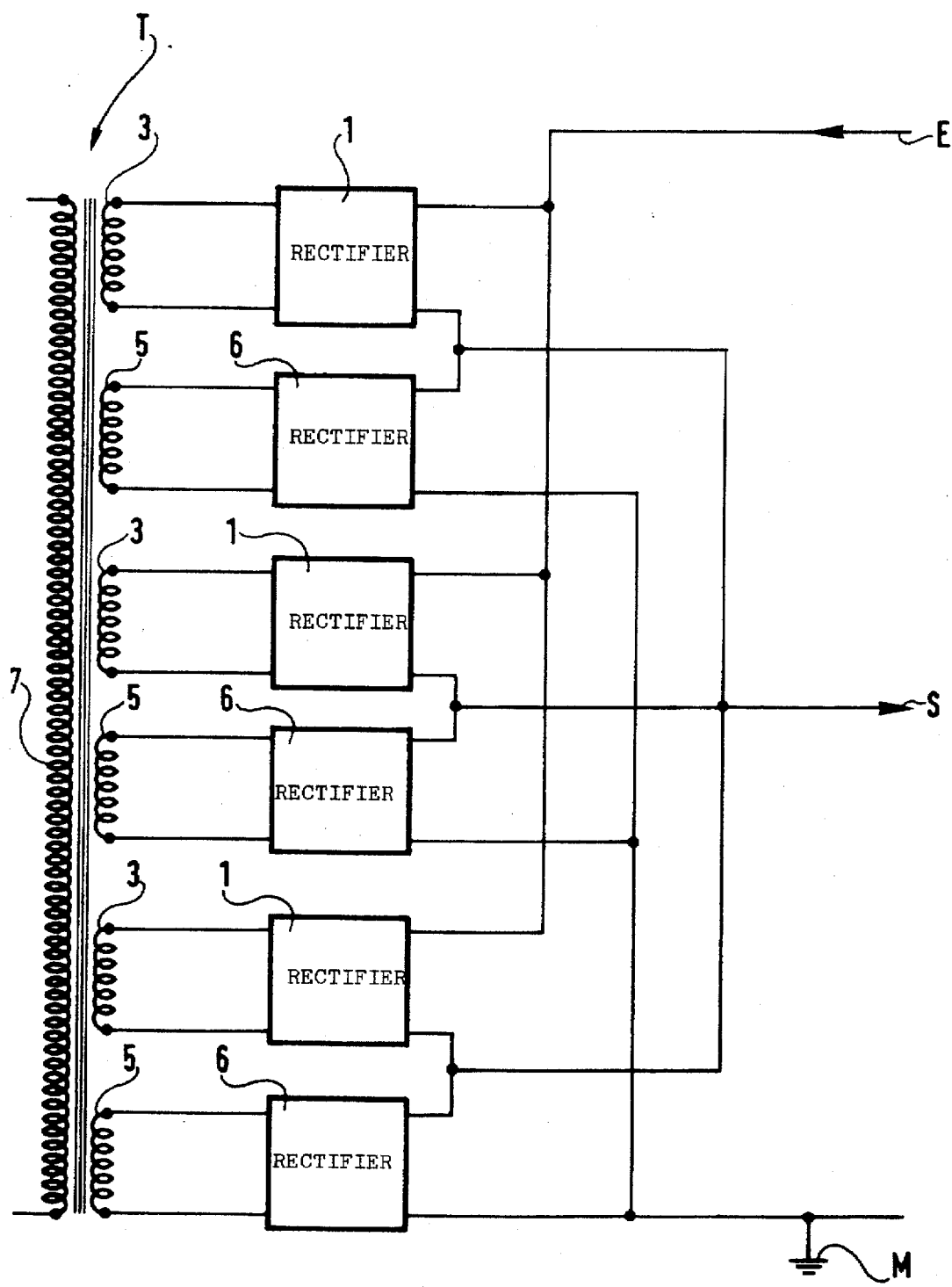

FIG. 3 shows an extension of the voltage lowering device shown in FIG. 2 to a voltage lowering device including six single-phase rectifiers.

DESCRIPTION OF THE PREFERRED EMBODIMENT

Figure 1:
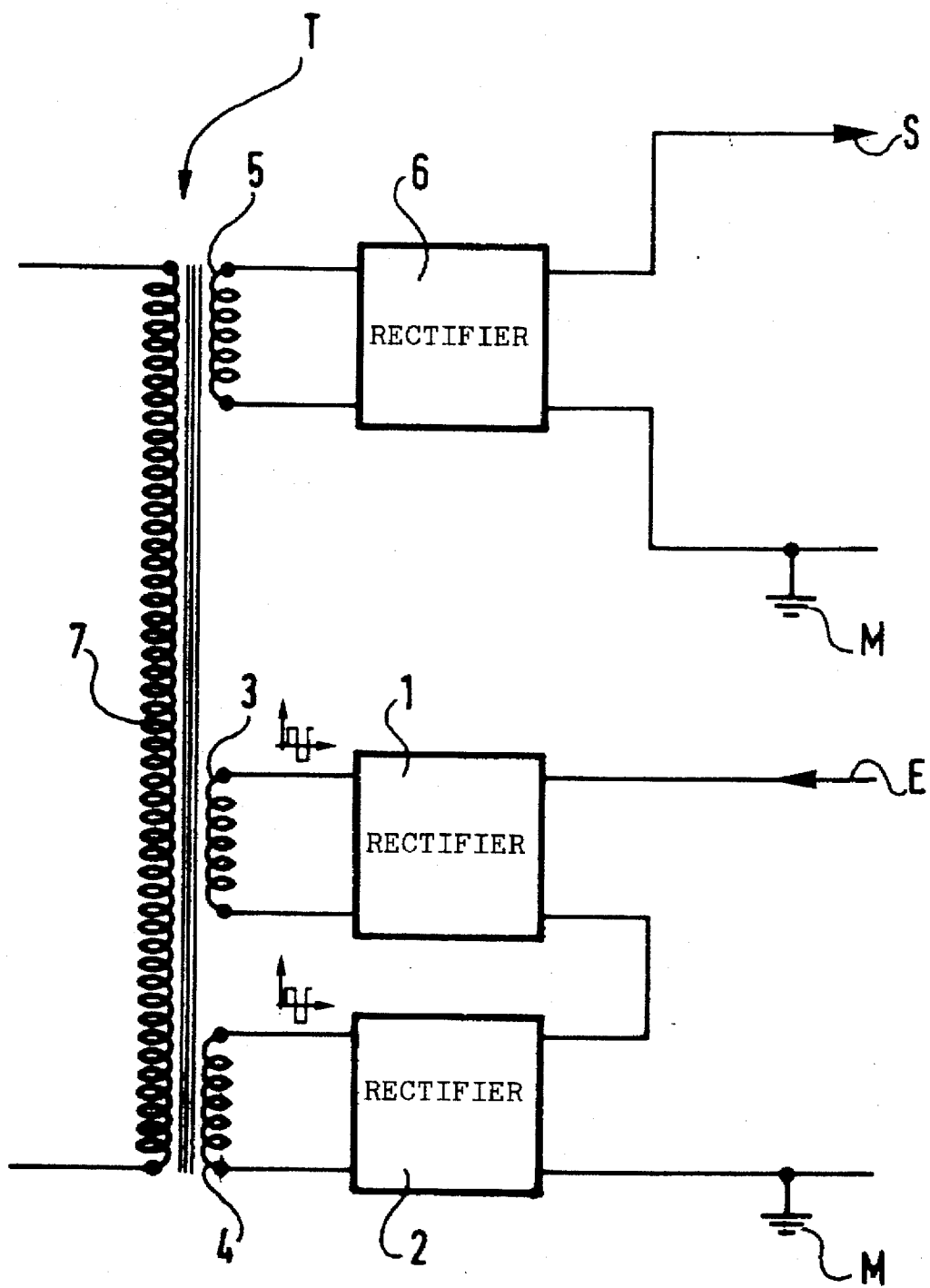
FIG. 1 shows a block schematic of a preferred embodiment of the voltage lowering device of the invention that uses galvanic isolation.

FIG. 1 shows a block schematic of a preferred embodiment of the voltage lowering device in accordance with the invention that uses galvanic isolation.

First and second forced commutation single-phase rectifiers 1 and 2 are connected in series across an input voltage E of, for example, 3 000 V.

The first and second single-phase rectifiers 1 and 2 respectively feed first and second secondary windings 3 and 4 of a main traction transformer T.

The first and second single-phase rectifiers operate as synchronous voltage inverters.

The first and second single-phase rectifiers respectively feed the first and second secondary windings 3 and 4 of the main traction transformer with a squarewave alternating current voltage of, for example, 3 000/2=1 500 V at a frequency such that the magnetic circuit of the main traction transformer T is not saturated.

A third forced commutation single-phase rectifier 6 is supplied by the third secondary winding 5 of the main traction transformer T.

This third single-phase rectifier 6 operates as a voltage increasing controlled rectifier according to the same principle as when used on a single-phase main power supply and thus regulates its direct current output voltage S to a value slightly greater than 3 000/2=1 500 V.

The main transformer T has an open-circuit primary winding 7, i.e. the primary winding is not used.

It is assumed above that the three secondary windings of the main traction transformer have the same number of turns, which is the case in the field of rail traction, for example.

The intermediate direct current voltage is galvanically isolated and can be referred to ground M as when using a single-phase main power supply.

A control device (not shown) integrated into the control electronics of the first and second single-phase rectifiers balances the voltages between the single-phase rectifiers and ensures that there is no direct current in the first and second secondary windings.

This device integrated into the control electronics of the first and second single-phase rectifiers is adapted to rectify the voltage differences by operating on the cyclic conduction ratio of the semiconductors of the first and/or second single-phase rectifier.

The voltage lowering device of the invention, including an open circuit primary winding of the main transformer, has the following advantages:

- it uses a single direct current output voltage that can always be referred to ground,
- it uses a single voltage with or without galvanic isolation,
- it avoids the need to isolate equipment supplied by the direct current voltage from the input voltage, and
- it avoids the need to use additional smoothing inductors as used in prior art devices.

FIG. 2 shows a block schematic of a preferred embodiment of the voltage lowering device of the invention that does not use galvanic isolation.

First and second forced commutation single-phase rectifiers 1 and 6 are connected in series across an input voltage E of, for example, 3 000 V.

4

The first forced commutation single-phase rectifier 1 has the same function as the single-phase rectifier described above with reference to FIG. 1.

The first single-phase rectifier 1 supplies a first secondary winding 3 of a main traction transformer T.

The first single-phase rectifier 1 operates as an oscillator and delivers a squarewave alternating current voltage of, for example, 3 000/2=1 500 V to the first secondary winding 3 of the main traction transformer.

The second forced commutation single-phase rectifier 6 is supplied by a second secondary winding 5 of the main traction transformer T.

This second single-phase rectifier 6 operates as a voltage increasing controlled rectifier in the same way as when using a single-phase main power supply and produces a regulated output voltage S referred to ground M having a value slightly greater than, for example, 3 000/2=1 500 V.

The main transformer T has an open circuit primary winding 7, i.e. the primary winding is not used.

The control device (not shown) of the first single-phase rectifier 1 ensures that there is no direct current in the first secondary winding.

The control device (not shown) of the second single-phase rectifier 6 regulates the output voltage S.

FIG. 3 shows an extension of the voltage lowering device shown in FIG. 2 to a voltage lowering device including six single-phase rectifiers.

FIG. 3 includes three pairs of forced commutation single-phase rectifiers 1, 6, each pair of single-phase rectifiers being supplied by an input voltage E of, for example, 3 000 V.

Each of the first single-phase rectifiers 1 is associated with a first secondary winding 3 and each of the second single-phase rectifiers 6 is associated with a second secondary winding 5.

The first single-phase rectifiers 1 each supply a first secondary winding 3 of the same main traction transformer T.

The second single-phase rectifier 6 all function as voltage increasing controlled rectifiers and all supply the same regulated output voltage S referred to ground M having a value slightly greater than, for example, 3 000/2=1 500 V.

The main transformer T has an open circuit primary winding 7, i.e. the primary winding is not used.

It is clear that in either of the preferred embodiments described hereinabove the voltage lowering device of the invention includes one pair of forced commutation single-phase rectifiers 1, 2 or 1, 6 connected to secondary windings 3, 4 or 3, 5 of a main traction transformer T, the power drawn from a direct current main power supply passing through the main traction transformer T, energy is recovered at a secondary winding 5 by means of a forced commutation single-phase rectifier 6 operating as a voltage increasing controlled rectifier and the other forced commutation single-phase rectifiers 1, 2 operate as synchronous voltage inverters.

The voltage lowering device of the invention finds one particular, but not exclusive, application in the field of rail traction.

The invention also applies to a synchronous traction system supplied by a single-phase main power supply and including a voltage lowering device as previously described.

There is claimed:

1. A voltage lowering device for producing a single intermediate direct current voltage, comprising: at least one pair of forced commutation single-phase rectifiers connected to secondary windings of a main traction transformer, said pair including a first forced commutation single-phase rectifier and a second forced commutation single-phase rectifier, said first forced commutation single-phase rectifier being connected to a first one of said secondary windings of said main traction transformer and said second forced commutation single-phase rectifier being connected to a second one of said secondary windings of said main traction transformer, wherein power drawn from a direct current main power supply passes through said main traction transformer and is recovered at said first one of said secondary windings by means of said first forced commutation single-phase rectifier operating as a voltage increasing controlled rectifier, said second forced commutation single-phase rectifier operating as a synchronous voltage inverter, wherein a primary winding of said main transformer is an open circuit.

2. A device according to claim 1 wherein said first forced commutation single-phase rectifier and said second forced commutation single-phase rectifier respectively supply said first one of and said second one of said secondary windings of said main traction transformer, said first single-phase rectifier operating as a voltage increasing controlled rectifier being supplied by said first one of said secondary windings and said second forced commutation single-phase rectifier supplying said second one of said secondary windings, said device further comprising a third forced commutation single-phase rectifier operating as a synchronous voltage inverter, said third forced commutation single-phase supplying a third one of said secondary windings of said main traction transformer.

3. A device according to claim 2 wherein said first one of, said second one of and said third one of said secondary windings of said main transaction transformer have a same number of turns.

4. A device according to claim 1 comprising a plurality of said pairs wherein said first forced commutation single-phase rectifier and said second forced commutation single-phase rectifier of each of said pairs are connected in series, each of said pairs being supplied by an input voltage, said first single-phase rectifiers operating as voltage increasing controlled rectifiers being supplied by said first one of said secondary windings of said main traction transformer and said second forced commutation single-phase rectifiers operating as synchronous voltage inverters supplying said second one of said secondary windings of said main traction transformer.

5. A device according to claim 1 wherein said first one of and said second one of said secondary windings of said main traction transformer are supplied by a squarewave alternating current voltage at a frequency such that a magnetic circuit of said main traction transformer is not saturated.

6. A device according to claim 1 wherein said first single-phase rectifier operates as a voltage increasing controlled rectifier and regulates an output direct current voltage to a value slightly greater than half a value of an input voltage.

7. A device according to claim 2 wherein said second one of and said third one of said secondary windings of said main traction transformer are supplied by a squarewave alternating current voltage at a frequency such that a magnetic circuit of said main traction transformer is not saturated.

8. A device according to claim 2 wherein said first single-phase rectifier operates as a voltage increasing controlled rectifier and regulates an output direct current voltage to a value slightly greater than half a value of an input voltage.

9. A device according to claim 1 wherein said device is included in an asynchronous traction system supplied by a single-phase main power supply.

* * * * *